UNITED STATES PATENT OFFICE.

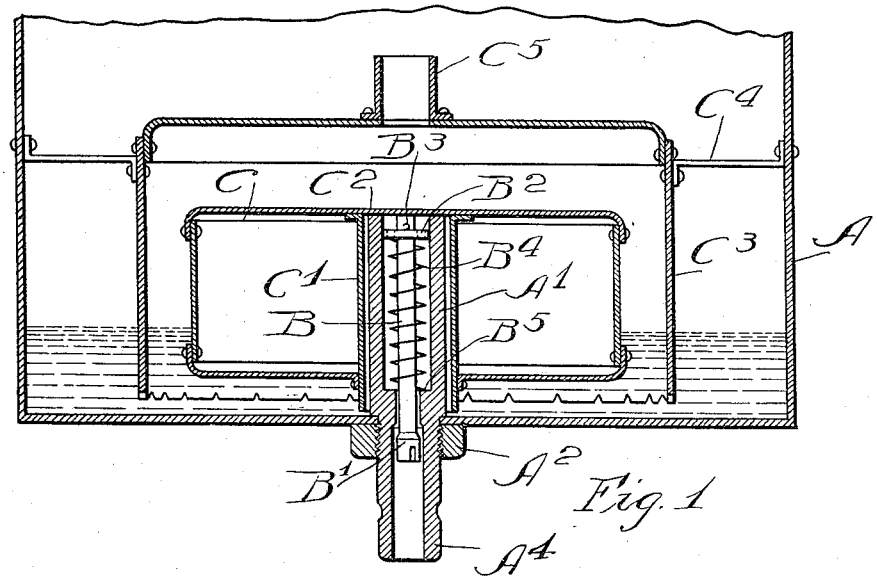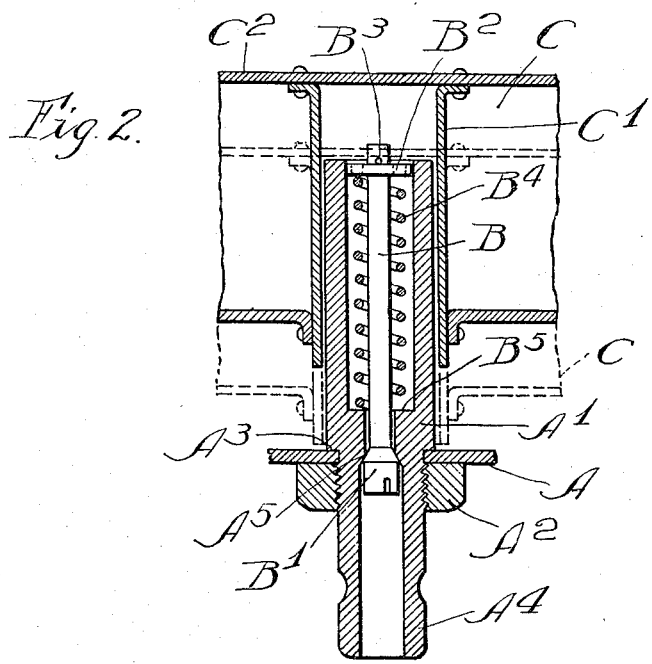

ORLAND L. IHRIG, OF SUNNYVALE, CALIFORNIA, ASSIGNOR TO M. RUMELY COMPANY, OF LAPORTE, INDIANA, A CORPORATION OF INDIANA.

FLOAT FEED CONTROL.

1,147,800.   Specification of Letters Patent.   Patented July 27, 1915.

Original application filed July 23, 1913, Serial No. 780,673. Divided and this application filed July 16, 1914. Serial No. 851,306.

*To all whom it may concern:*

Be it known that I, ORLAND L. IHRIG, a citizen of United States, residing at Sunnyvale, in the county of Santa Clara and State of California, have invented a certain new and useful Improvement in Float Feed Controls, of which the following is a specification.

My invention relates to improvements in float feed control means for maintaining constant the level of liquids in tanks and the like.

It embodies subject matter divided out of my co-pending application No. 780,673, which was filed July 23, 1913.

It is illustrated diagrammatically in the accompanying drawing, wherein is shown a horizontal section through my device.

Figure 1 is an axial section of the device. Fig. 2 an enlarged detail of the plug valve with the float member in raised position.

Like parts are indicated by the same letter in all figures.

A is a tank.

$A^1$ is a valve housing contained in an aperture in the bottom of the tank and held firmly in position by a nut $A^2$ which draws the shoulder $A^3$ down against the bottom of the tank. $A^4$ is a liquid supply pipe connected with said valve housing and $A^5$ is a valve seat.

B is a valve stem having a plug valve $B^1$ on the lower end thereof in opposition to the valve seat $A^5$.

$B^2$ is a holding ring held on the valve stem by the pin $B^3$ and $B^4$ is a valve spring contained within the valve housing and surrounding the valve stem resting upon the shoulder $B^5$ at one end compressed by the valve ring $B^2$ at the other. The valve stem B projects upwardly from the valve housing $A^1$.

C is a float having the guide sleeve $C^1$ centrally disposed therein surrounding and in slidable engagement with the valve housing $C^1$. This float has a flat top $C^2$ which rests on the upper end of the valve stem B.

$C^3$ is a guard housing surrounding the float and valve housing fixed in position by the braces $C^4$ on the tank A and having a vent $C^5$ in the top thereof.

I claim:

A float feed valve comprising a vertical valve housing, having an open top, a valve seat in the bottom thereof, a valve stem contained therein and adapted to project thereabove, a valve carried thereby in opposition to said seat, yielding means contained within the housing and surrounding the stem for closing the valve, and a float surrounding and guided by the housing and adapted to rest directly upon the end of the valve stem, the housing being closed against liquid discharge except at its open top, the float being adapted to completely cover and inclose the housing but spaced therefrom to permit passage of liquid down along the outer wall of the housing between it and the float.

In testimony whereof, I affix my signature in the presence of two witnesses this 7th day of July, 1914.

ORLAND L. IHRIG.

Witnesses:
    LAUREL M. DOREMUS,
    GENEVA HIRTH.

Copies of this patent may be obtained for five cents each, by addressing the "Commissioner of Patents, Washington, D. C."